United States Patent [19]

Topham

[11] 3,876,852

[45] Apr. 8, 1975

[54] METHOD AND APPARATUS FOR UNDERWATER WELDING

[75] Inventor: Leland D. Topham, Houston, Tex.

[73] Assignee: Hydro Tech International, Inc., Houston, Tex.

[22] Filed: Apr. 25, 1973

[21] Appl. No.: 354,358

[52] U.S. Cl. ............................ 219/72; 61/69; 61/82; 219/74; 219/137
[51] Int. Cl. ....... B23k 9/16; B63c 11/44; B23k 9/00
[58] Field of Search ................. 219/72, 74, 75, 137; 61/69 R, 69 A, 68, 70, 81, 82; 114/16 R, 16.8

[56] References Cited
UNITED STATES PATENTS

| | | | |
|---|---|---|---|
| 1,022,553 | 4/1912 | Howell | 219/72 X |
| 1,195,793 | 8/1916 | Dunn et al. | 61/70 |
| 1,800,310 | 4/1931 | McGee | 61/69 A |
| 2,479,217 | 8/1949 | Diamond | 61/69 R |
| 2,667,751 | 2/1954 | Osborn | 219/72 UX |
| 2,881,305 | 4/1959 | Wojciak et al. | 219/74 X |
| 3,328,970 | 7/1967 | Giambelluca et al. | 219/72 UX |
| 3,344,614 | 10/1967 | Byck | 61/69 R |
| 3,386,254 | 6/1968 | Connally | 219/72 UX |
| 3,462,961 | 8/1969 | Berard | 61/69 R |
| 3,581,042 | 5/1971 | Pilia | 219/72 |
| 3,632,950 | 1/1972 | Berghof | 219/72 |
| 3,671,707 | 6/1972 | Cunningham | 219/74 |

FOREIGN PATENTS OR APPLICATIONS

| | | | |
|---|---|---|---|
| 2,031,728 | 11/1970 | France | 219/72 |

Primary Examiner—A. Bartis

[57] ABSTRACT

Apparatus and method for making an underwater weld by a diver, including an underwater hand-portable housing having a top portion and depending sides, with at least a part of the housing being transparent for viewing therethrough by the diver when making the weld and with the bottom of the housing being open for insertion therethrough of the welding tip being manipulated by the diver. The device includes a means for detachably supporting the housing adjacent to a work-piece, such as an underwater pipe, to thereby form with the work-piece a welding space which is closed at the top and sides thereof and which is open on the bottom thereof, which space includes the area adjacent to the work-piece where the welding is to be performed. Means are provided for supplying a pressurized gas to the welding space at sufficient pressure to evacuate water therefrom through the bottom portion of the housing. The apparatus and method of this invention is particularly useful for peforming an underwater weld by a diver without the necessity for the diver himself being confined in a dry habitat, but rather the workpiece where the welding is to be performed is maintained in a dry habitat and the diver is thereby permitted to insert the welding apparatus into the dry habitat and perform the welding while viewing the welding operation through a transparent portion of the housing.

6 Claims, 9 Drawing Figures

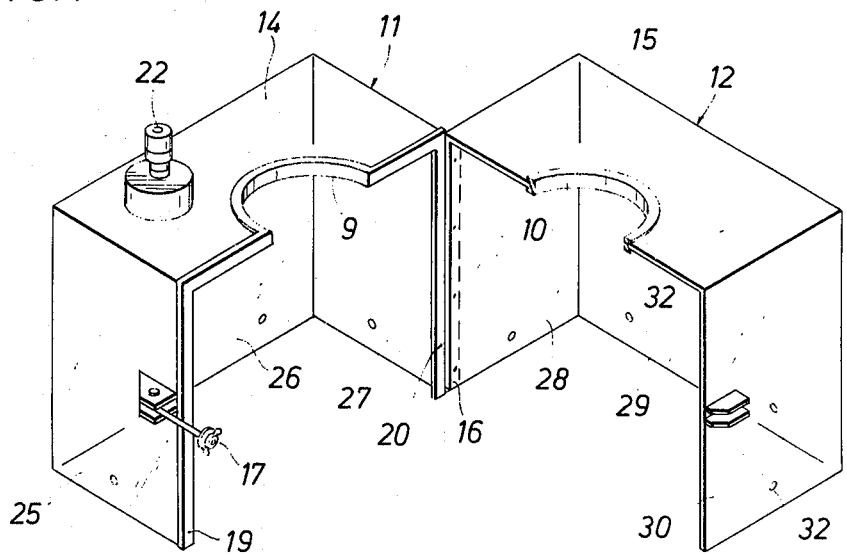
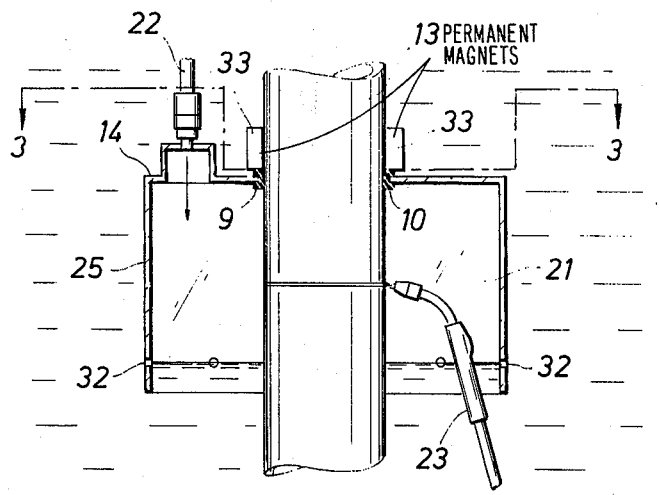
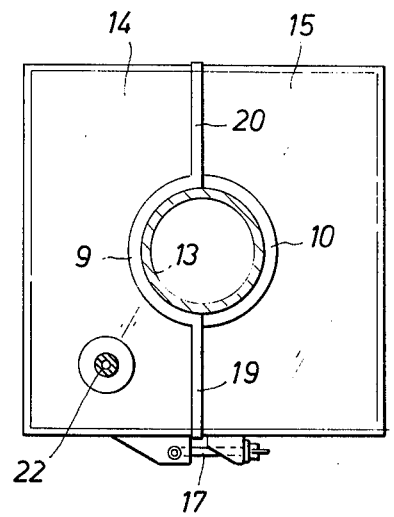
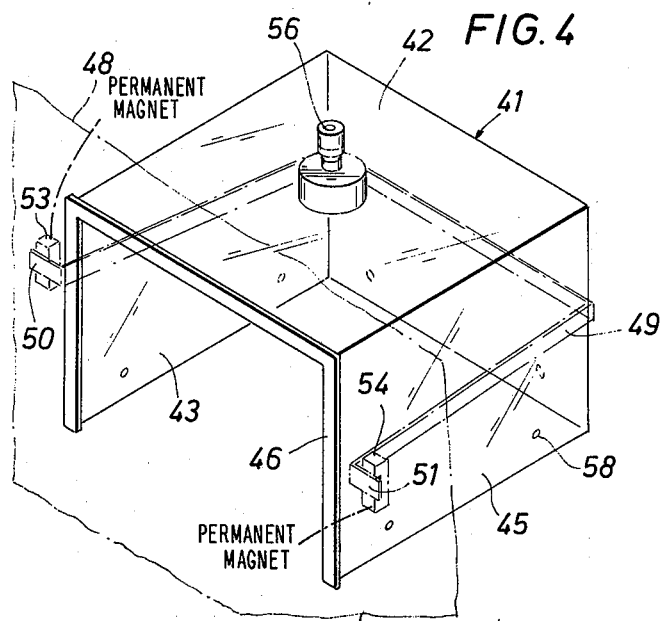
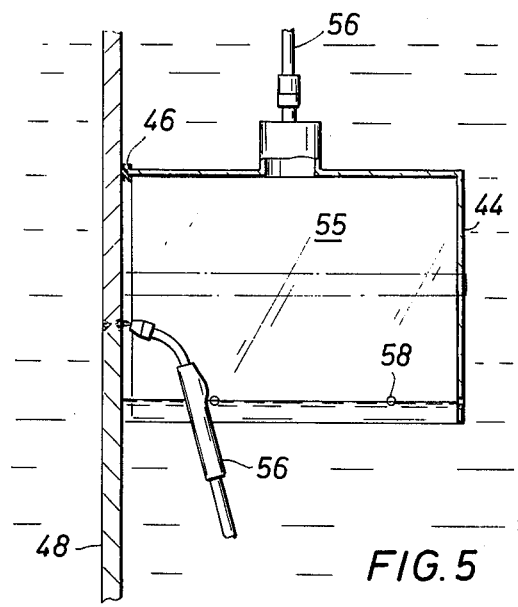

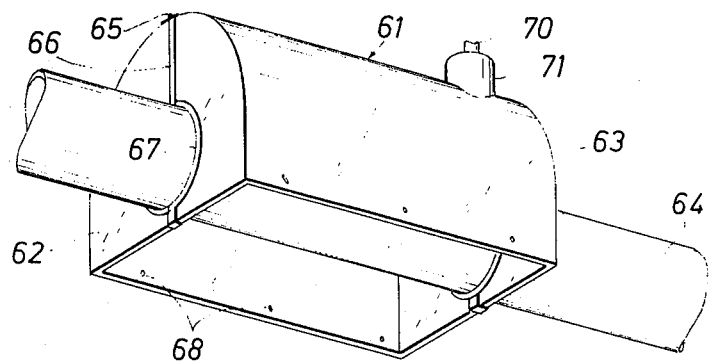
FIG. 6
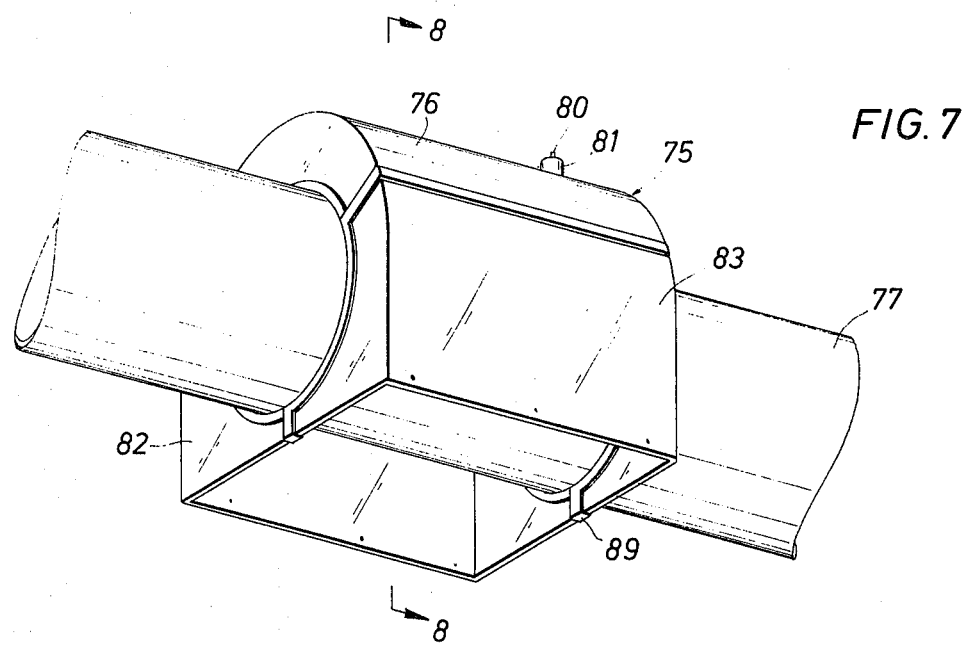
FIG. 7
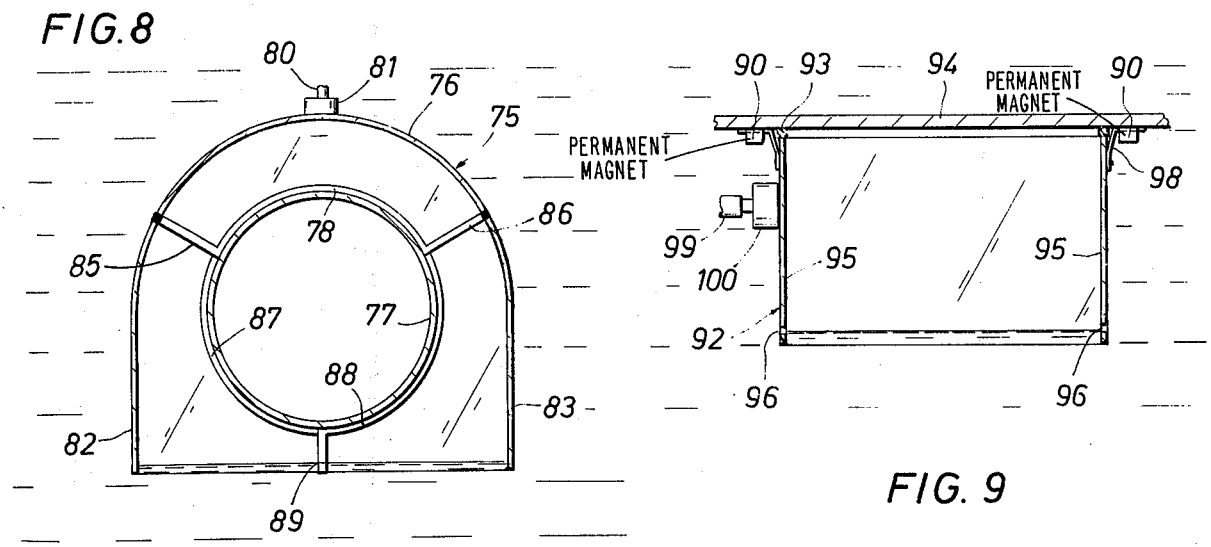
FIG. 8
FIG. 9

METHOD AND APPARATUS FOR UNDERWATER WELDING

BACKGROUND OF THE INVENTION a. Field of the Invention

This invention relates to a method and apparatus for underwater welding. More particularly, this invention relates to a method and apparatus for underwater welding, as for example by the use of an electric arc, and which method may be carried out by a single diver carrying a portable housing which is used to form a water-free, gas welding area adjacent to the work-piece where the welding is to be performed.

b. Description of the Prior Art

Prior art methods and apparatus have been developed for underwater welding and underwater electric arc welding. U.S. Pat. No. 3,632,950; U.S. Pat. No. 3,671,707; and French Pat. No. 2,031,728 are generally illustrative of prior art methods and apparatus for underwater welding.

However, prior art methods and apparatus have not been fully satisfactory in all situations, particularly where it is desirable to have a small apparatus which can be conveniently operated by a single diver, which is simple of construction and operation, and which can be manipulated in an underwater environment with a minimum of effort and training.

SUMMARY OF THE INVENTION

Briefly stated, this invention relates to a method of underwater welding on a work-piece and includes the combination of steps comprising forming a normally portable housing having a top portion and depending side portions with at least a portion of the housing being transparent for viewing therethrough. The housing is supported adjacent the work-piece to thereby form with the work-piece a welding space which is closed at the top and sides thereof and open on the bottom side thereof and which welding space includes the area adjacent to the work-piece where the welding is to be performed. Gas is supplied to the welding space at a pressure great enough to force water therefrom. The tip of a welding apparatus is inserted into the welding space through the open bottom of the housing and thereafter welding is performed on the work-piece in the welding space. The gas which is used to evacuate the welding space may be either applied directly to the welding area through an aperture in the housing or it may be supplied by passing the gas through a portion of the welding apparatus. The welding may be performed by use of a consumable electrode issuing from an insulated gun having a gas shield about the electrode. Preferably, the housing is detachably secured to the work-piece during the welding operation.

The apparatus of this invention includes a normally portable housing having a top portion and depending sides, with at least a portion of the housing being transparent for viewing therethrough. The apparatus also includes means for supporting the housing adjacent to the work-piece to thereby form with the work-piece a welding space which is closed at the top and sides thereof and open on the bottom thereof and which space includes the area adjacent to the work-piece where the welding is to be performed. The apparatus includes means for supplying a pressurized gas to the welding space at sufficient pressure to force the water therefrom. The apparatus may also include a welding apparatus adapted for insertion of the tip thereof through the open bottom for effecting welding on the work-piece when the welding space is cleared of water. Gas may be supplied to the welding space either through a conduit through the welding gun or by a conduit connected to an aperture in the housing. Preferably, the apparatus includes means for detachably securing the housing to the work-piece during the welding operation. Further, the housing may be segmented for clamping about either vertical or horizontal pipe or the like which are to be welded.

BRIEF DESCRIPTION OF THE DRAWINGS

FIG. 1 is a perspective view in illustrative form showing one embodiment of the housing portion of the invention formed with two sections which are hinged together and shown in the open position.

FIG. 2 is a generally central sectional view through the housing shown in FIG. 1 after the same has been installed on a vertical work-piece.

FIG. 3 is a top plan view generally taken along line 3—3 of FIG. 2.

FIG. 4 is a perspective view showing an alternative embodiment of the apparatus of this invention.

FIG. 5 is a central sectional view of the apparatus as shown in FIG. 4 and showing the insertion of a tip of a welding gun through the open bottom of the housing.

FIG. 6 is a perspective view of a segmented housing of one embodiment of this invention showing the same mounted on a generally horizontally extending work-piece.

FIG. 7 is a view similar to FIG. 6 showing a further alternative embodiment of a segmented housing adapted for welding large diameter pipe or the like.

FIG. 8 is a sectional view taken generally along line 8—8 of FIG. 7.

FIG. 9 is a central sectional view of a still further embodiment of an alternate form of the apparatus of this invention showing the same supported on the lower side of a work-piece in such fashion that the work-piece forms a part of the top of the welding space.

DESCRIPTION OF THE PREFERRED EMBODIMENTS

Referring now to FIGS. 1 - 3, one embodiment of the housing of this invention is shown, which includes segmented halves or sections 11 and 12, which are arranged for matingly securing about a vertical member such as pipe 13 as shown in FIG. 2. The top portion of the housing shown in FIGS. 1 - 3 includes top portions 14 and 15 which have matching semicircular recesses in which are fitted semicircular flexible seals 9 and 10, respectively.

Sections 11 and 12 are hinged together by hinge 16 along one side thereof and have a latch 17 along the opposite side thereof for securing sections 11 and 12 about pipe 13 as shown in FIGS. 2 and 3. Further, the spaces between the sections 11 and 12 are further sealed by an L-shaped gasket 19 on one side thereof and a similar gasket 20 on the other side thereof.

Means are provided for supplying pressurized gases to the welding space generally designated by the numeral 21 which may be either in the form of a gas conduit 22 connected to pass gas through an aperture in the housing as shown or may alternatively be in the form of a gas conduit associated with the welding gun, such as welding gun 23, shown having the tip thereof inserted into welding space 21. Welding gun 23 may be of the metal inert gas type which ejects a stream or sheath of protective gas about a consumable electrode also issuing from gun 23 and which is used to strike an arc with the work-piece or pipe 13 to effect welding in welding space 21. Sections 11 and 12 of the housing include depending portions or depending sidewalls identified by the numerals 25, 26, 27, 28, 29 and 30. Along the lower edge of sidewalls 25–30 there are provided a plurality of vent holes 32 for the purpose of assuring that excess gas exits from the housing at a particular place rather than from random locations around the bottom of the box.

It is to be understood that the housing comprising sections 11 and 12 may be made of plexiglass or the like, or at least one of the sidewalls or top is made of plexiglass so as to facilitate viewing therethrough. Further, it is to be understood that the sides of the housing will be generally of the size to be portable underwater such that an operator could take the housing underwater and attach the same to a vertical pipe, such as pipe 13, and proceed with the welding as shown in FIG. 2 while viewing the same through a transparent portion of the housing. In some instances there will be a tendency for the housing to float upwardly on pipe 13, and in those instances a pair of permanent magnets 33 may be attached to pipe 13 above the top portion of sections 11 and 12 to prevent upward movement thereof, as shown.

In operation the hand portable apparatus described with respect to FIGS. 1 – 3 would normally be secured about pipe 13 as shown in FIGS. 2 and 3. Thereafter the gas would be applied in sufficient pressure either through conduit 22 or the conduit in gun 23 so as to force water from welding space 21 and out openings 32. Once the welding space 21 is cleared of water, the same would be maintained clear of water by additions of gas therethrough as required to accommodate any leakage that might occur. Thereafter welding is accomplished by inserting the tip of welding gun 23 upwardly through the bottom of the housing as shown in FIG. 2. While electric arc welding utilizing a consumable electrode with a supply of metal inert gas is preferred, it is to be understood that other types of welding apparatus can be used as, for example, gas welding or the like. In either event it is necessary that the welding apparatus or gun be properly insulated as is known in the art. The underwater welder or diver has both hands free to manipulate the welding gun when using the apparatus of this invention as shown in FIGS. 1 – 3 and does not have to worry about supporting or otherwise holding the housing during the welding operation. Once the welding operation has been completed, then the housing can be removed by unlatching latch 17 and removing the magnets 33. The housing can then be moved to another location for a subsequent welding operation.

Referring now to FIGS. 4 and 5, an alternative embodiment of this invention will be described. This embodiment of the housing is generally indicated by the numeral 41 and includes a top 42 and three depending sidewalls 43, 44, and 45. One side of housing 41 is left open and has attached therewith a flexible C-shaped seal 46, which is arranged for sealing engagement with vertically extending flat work-piece 48 shown in dotted lines in FIG. 4.

Means are provided for detachably securing housing 41 to work-piece 48, and these are shown in the form of a metal strap 49 which extends around the sides 43, 44, and 45 and has outwardly extending portions 50 and 51 which are adapted for having permanent magnets 53 and 54 supported thereover and attached to work-piece 48, which will of course be of iron or the like.

When housing 41 is mounted against work-piece 48, which is shown in section in FIG. 5, there is formed a welding space which has been designated by the numeral 55, which space is cleared of water in the same manner as with the prior embodiment, that is, pressurize the gas of sufficient pressure to evacuate water from welding space 55 is applied either through a gas conduit 56 passing through an aperture in housing 41 as shown, or it may be supplied through a welding gun 56 which may be of the same type as described with respect to gun 23 and the prior embodiment welding gun or guns.

Sidewalls 43, 44, and 45 may also be provided with a plurality of small apertures or holes 58 near the bottom thereof to permit controlled exiting of gas from welding space 55 the same as with the holes 32 in the prior embodiment.

FIGS. 4 and 5, therefore, show another apparatus which, as with the prior embodiment, is useful in conjunction with a welding piece to form a closed top and sidewalls but with an open bottom through which the welding operation can be performed. Again, the embodiment in FIGS. 4 and 5 would be dimensioned for easy hand portability in an underwater environment. The housing shown in FIGS. 4 and 5 is also made of plexiglass or the like for easy viewing therethrough.

Referring now to FIG. 6, an alternative embodiment of the invention will be described which embodiment is useful for welding small diameter pipes which might be held in a generally horizontally extending position. In this instance the housing is designated generally by the numeral 61 and is comprised of two segments 62 and 63 which are shown positioned about horizontally extending pipe 64. It is to be understood that segments 62 and 63 may be hingedly connected together at the top by hinge 65 and with the space between the tops and end walls of segments 62 and 63 sealed by gasket 66 and with semicircular gaskets 67 being provided adjacent to pipe 64. It will thus be seen that the top portions of segments 62 and 63 form the top part of the welding chamber and the depending sidewall portions of segments 62 and 63 form the sides of the welding space. The depending sidewalls may be provided with exhaust ports 68 which are similar to the exhaust ports of the prior embodiment.

As with the prior embodiment, water may be evacuated from the welding space inside of housing 61 either through a conduit provided in the hand-held welding gun as with the prior embodiments, or it may be applied through a gas conduit 70 connected to a diffuser 71 which is attached to the top portion of one of the segments 62 or 63, as shown.

In operation, the underwater diver or welder would attach housing 61 to pipe 64 as shown. Thereafter the welding space would be evacuated of water by supplying pressurized gas thereto as explained above. Once the welding space was cleared of water, the space could be kept clear of water by supplying additional pressurized gas thereto to accommodate any leakage that may occur. With the welding space thus cleared of water, the operator inserts the tip of a welding gun into the welding space and effects welding on pipe 64 the same as with the prior embodiments. To insure that housing 61 does not become dislodged prior to completion of the welding operation, latch means (not shown) may be added to insure that sections 62 and 63 remain clamped about pipe 64.

Referring now to FIGS. 7 and 8, a further alternative embodiment of the apparatus of this invention is shown which is useful when welding large diameter pipe which may be held in a generally horizontally extending position. In this embodiment, the housing is generally designated by the numeral 75 and includes an arcuate shaped top portion 76 which extends approximately 120° around pipe 77 and has arcuate endwalls which conform with the curvature of pipe 77 and are sealed therewith by arcuate shaped gaskets 78. Pressurizing gas may be supplied to housing 75 through conduit 80 connected to gas diffuser 81, which is located in an uppermost position of top portion 76. Alternatively gas may be supplied to the welding space inside the top portion of 76 through a hand-held conduit or welding gun as with the prior embodiments. It will be seen that the portion 76 by itself forms a welding space wherein the top part of pipe 77 may be welded initially and is so shaped that the tip of the welding apparatus may be inserted along the bottom sides thereof adjacent to the pipe 77. Thereafter, as welding progresses down the sides of the pipe 77, longitudinal sections 82 and 83 may thereafter be connected as by hinges to the depending sides of top portion 76 as shown. Again, the space between top portion 76 and segment 82 may be sealed as by gasket 85, and the space between top portion 76 and segment 83 is likewise sealed by gasket 86, which is flexible and may be made of foam rubber or the like as with the previously described gaskets. Segments 82 and 83 generally extend an additional 120° around pipe 77 and have the end walls sealed therewith as by arcuate shaped gaskets 87 and 88 on each end thereof. Further, the space between the endwalls of segments 82 and 83 may be likewise sealed by gaskets 89.

In operation the apparatus shown in FIGS. 7 and 8 is initially installed on top of pipe 77 with top portion 76 only being initially installed. Thereafter, the welding chamber is evacuated by the application of pressurized gas thereto and welding performed on the top portion of pipe 77. Thereafter, the segments 82 and 83 are attached to the sides of top portion 76 to complete the apparatus as shown in FIGS. 7 and 8. Additional gas is supplied to enlarge the welding space and free the work area of pipe 77 of water. At this point, the welding operation is continued down sides and bottom of pipe 77.

The embodiment shown in FIGS. 7 and 8 is particularly useful in welding large diameter pipe on the order of say 30 inches or the like. By utilizing only top portion 76 initially, a welder's hand can be easily inserted through the open bottoms of top portion 76 to effect welding on top of pipe 77. It would be difficult to reach the top part of pipe 77 if segments 82 and 83 were initially attached to top portion 76. Hence, by having segments 82 and 83 detachably supported by top portion 76, the same may be added when it is desired to continue downwardly along the sides of the pipe as explained above.

As with the prior embodiments, it is to be understood that segments 82 and 83 may have latching means (not shown) for securing the two sections together along the bottom to prevent premature separation thereof. Further, housing 75 is preferably made of transparent material to facilitate viewing of the welding operation.

Referring to FIG. 9, a further embodiment of the invention will be described which is useful for effecting welding on the bottom side of a generally horizontally extending plate of steel or the like.

In this embodiment the housing is generally designated by the numeral 92. The top portion of housing 92 generally includes a rectangular shaped rubber gasket 93 which is arranged for abutment against and sealing with steel plate 94. Hence, it will be seen that the gasket 93 and plate 94 form the top side of the welding space which will be described hereinafter. Housing 92 has four depending sidewalls which have been designated by the numeral 95 and which have small exhaust ports 96 spaced along the bottom thereof.

Means for detachably securing housing 92 to plate 94, which in this instance is the work-piece, take the form of a pair of metal brackets 97 and 98 which are secured to sidewalls 95 and which are held in position against plate 94 by means of permanent magnets 90 mounted thereover.

In operation, the housing 92 is installed on the bottom side of the work-piece, which in this instance is steel plate 94, as shown in FIG. 9, and is secured thereto by means of magnets 90 being placed over brackets 97 and 98. Thereafter pressurized gas of a sufficient pressure to force water from housing 92 is supplied through either a gas conduit 99 connected to diffuser 100 mounted on one of the sidewalls 95, or alternatively pressurized gas may be supplied via the welding gun, as described with the prior embodiments. In any event the water is evacuated from the welding space by application of pressurized gas, with the water evacuating through exhaust ports 96. As water encroaches on the welding space by virtue of any leakage, the same may be cleared of water by reapplication of additional pressurized gas. With the apparatus positioned as shown in FIG. 9, welding can thereafter be effected by inserting the tip of the welding gun up through the open bottom of housing 92 to effect welding on the lower side of plate 94. It is to be understood that sidewalls 95 are preferably of plexiglass or the like so as to permit viewing therethrough to facilitate the welder's viewing of the welding operation.

It will thus be observed that the art has been provided with a hand portable welding apparatus which is useful in an underwater location for carrying out underwater welding operations with a minimum of equipment and operational steps involved. The apparatus and method of this invention permits underwater welding of a quality which duplicates that of dry land welding. By having the housing of the apparatus detachably secured to the work-piece, the operator is then free to use both hands to carry out the welding operation which is conventional for most welders.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of this invention may be utilized independently of the use of other features, all as would be apparent to one skilled in the art after having the benefit of this description of the invention.

What is claimed is:

1. A method of underwater welding a work-piece by a diver, the combination of steps comprising:

forming a hand-portable housing having a top portion and depending side portions, with at least a part of said housing being transparent for viewing thereinto by said diver, and with the bottom of said housing being open, said housing being dimensioned to accommodate the tip of a welding gun therein through said open bottom and being smaller in size than that which would be required to accommodate the body of a diver therein;

detachably mounting said housing by said diver in engagement with said work-piece to thereby form with said work-piece a welding space which is closed at the top and sides thereof and open on the bottom thereof, and which welding space includes the area of said work-piece where said welding is to be performed, enabling access to said space by said diver through said open bottom while the diver remains located in the water exteriorly of said housing;

supplying pressurized gas to said welding space at a pressure great enough to evacuate water therefrom thereby exposing said work-piece to a gaseous atmosphere;

inserting the welding tip of a welding apparatus by said diver into the water evacuated welding space through said open bottom of said housing without effecting closure of said open bottom;

and welding said work-piece by said diver while located in the water exteriorly of said housing as aforesaid, said diver operating said welding tip in said evacuated welding space while viewing the welding operation from the exterior of said housing through the transparent part thereof.

2. The invention as claimed in claim 1 wherein:

said gas is supplied to said welding space by passing said gas through an aperture in one of the closed sides of said housing.

3. The invention as claimed in claim 1 wherein:

said welding is performed by drawing an electric arc between consumable electrode and said work-piece, and ejecting said electrode and said gas from said welding apparatus into said welding space.

4. The invention as claimed in claim 1 including:

forming said side portions of said housing with openings therethrough adjacent the lower edges thereof for the escape of water and excess gas therethrough.

5. The invention as claimed in claim 1 wherein said work-piece includes a pipe and including the steps of:

forming said hand-portable housing with a plurality of mating sections;

and clamping said sections about said pipe to thereby form said welding space.

6. A method of underwater welding a work-piece by a diver, the combination of steps comprising:

forming a hand-portable housing having a top portion and depending side portions, with at least a part of said housing being transparent for viewing thereinto by said diver, and with the bottom of said housing being open, said housing being dimensioned to accommodate the tip of a welding gun therein through said open bottom and being smaller in size than that which would be required to accommodate the body of a diver therein;

detachably mounting said housing by said diver in engagement with said work-piece to thereby form with said work-piece a welding space which is closed at the top and sides thereof and open on the bottom thereof, and which welding space includes the area of said work-piece where said welding is to be performed, enabling access to said space by said diver through said open bottom while the diver remains located in the water exteriorly of said housing;

inserting the welding tip of a welding apparatus by said diver into the welding space through said open bottom of said housing without effecting closure of said open bottom;

supplying pressurized gas to said welding space by passing said gas through a portion of said welding tip, said gas being at a pressure great enough to evacuate water from said welding space thereby exposing said work-piece to a gaseous atmosphere;

and welding said work-piece by said diver while located in the water exteriorly of said housing as aforesaid, said diver operating said welding tip in said water evacuated welding space while viewing the welding operation from the exterior of said housing through the transparent part thereof.

* * * * *

UNITED STATES PATENT OFFICE
CERTIFICATE OF CORRECTION

Patent No. 3,876,852      Dated April 8, 1975

Inventor(s) Leland D. Topham

It is certified that error appears in the above-identified patent and that said Letters Patent are hereby corrected as shown below:

In all instances, the title should read "METHOD FOR WELDING UNDERWATER".

In column 7, line 50, the word "a" should be inserted before the word "consumable".

In column 8, line 1, cancel "and said gas".

Signed and Sealed this twenty-second Day of July 1975

[SEAL]

Attest:

RUTH C. MASON
Attesting Officer

C. MARSHALL DANN
Commissioner of Patents and Trademarks